June 20, 1961  J. M. JONES  2,988,914
CONTINUOUSLY RECORDING VISCOSIMETER
Filed May 12, 1955  2 Sheets-Sheet 2

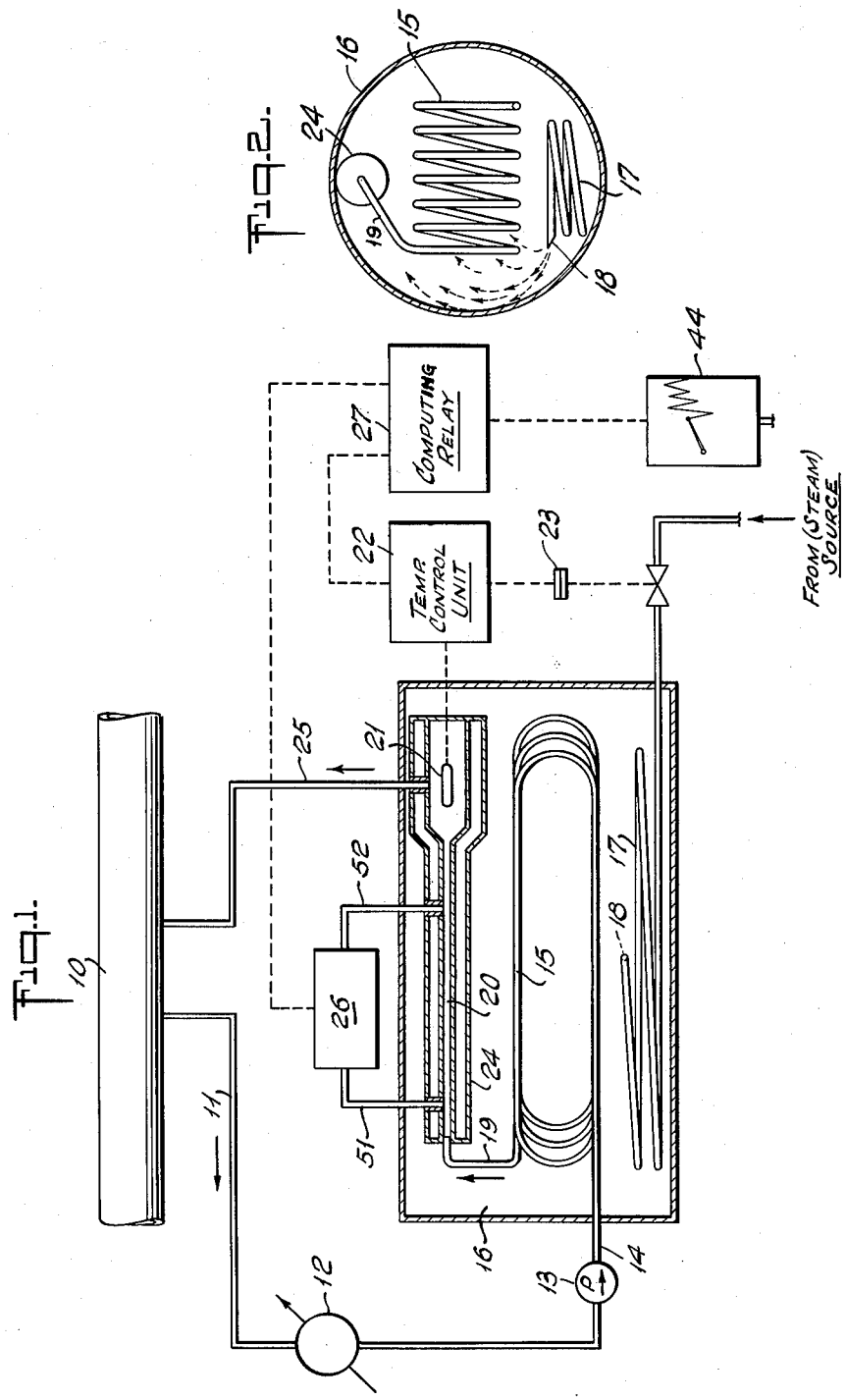

United States Patent Office 2,988,914
Patented June 20, 1961

2,988,914
CONTINUOUSLY RECORDING VISCOSIMETER
James M. Jones, Port Arthur, Tex., assignor to
Texaco Inc., a corporation of Delaware
Filed May 12, 1955, Ser. No. 507,853
12 Claims. (Cl. 73—54)

This invention relates to an apparatus for automatically and continuously recording the viscosity of a fluid, such, for example, as a lubricating oil.

It is well known that the viscosity of oil can be accurately determined by measuring the differential in pressure in a system obtained when a fluid is pumped through that system, providing the flow-rate and flow-temperature are kept constant. Constant pressure is not difficult to maintain but slight fluctuations in temperature away from the standard for measurement sometimes are difficult to prevent. In such a system it is extremely necessary that the temperature be held constant or that some immediate automatic compensation be made for its deviation from the constant since slight fluctuations in the temperature affect viscosity, the magnitude of which depends on the nature of the fluid to be measured.

Complicated and expensive equipment for accurately regulating and controlling the temperature may be employed. However, where such equipment is not justified, a simpler and less expensive accurate arrangement should be made available. The present invention meets this need and is an improvement over my application, Serial No. 376,949, filed August 27, 1953, now Patent No. 2,791,902, granted May 14, 1957. It provides both thermo-insulating means surrounding that section of the system across which the differential pressure is sensed and a temperature compensating device in an apparatus for continuously recording the viscosity of a fluid. Thus, the viscosity of a liquid at constant flow-rate and constant temperature is continuously and accurately recorded while maintaining a more constant temperature across the place of differential pressure measurement and compensating automatically for such slight variations in temperature which may occur.

Automatic temperature compensation is supplied by an arrangement designed to transfer an impulse caused by a temperature change of the fluid in a system to a computing relay which then automatically sends an impulse designating the corrected viscosity to a recording element.

Figure 3:
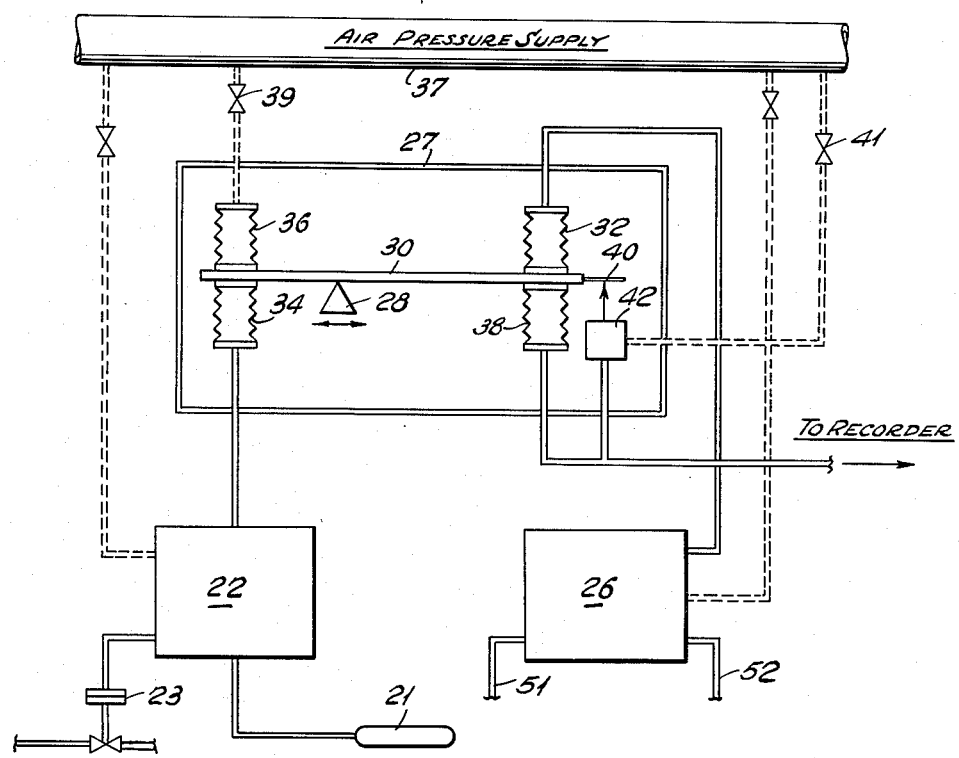
Figure 4:
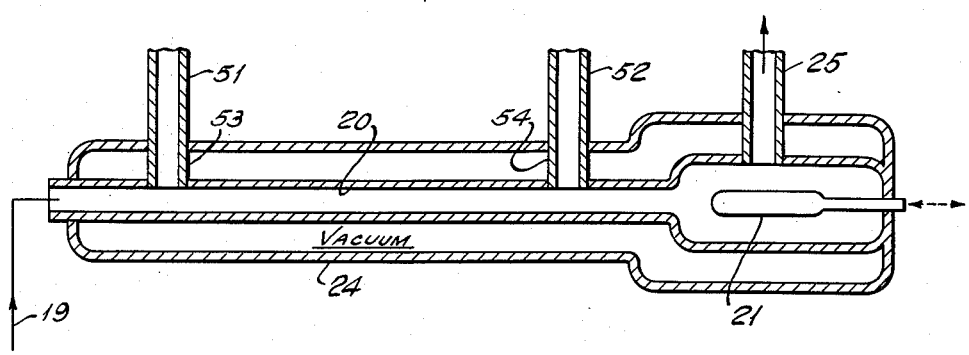

Referring to the drawings: FIG. 1 is a schematic delineation of the system utilized in the performance of my invention. FIG. 2 is a sectional side view of the cylindrical bath particularly showing means to discharge steam or the like tangentially to the cylinder walls. FIG. 3 shows schematically a representation of the computing relay, and FIG. 4 is an enlarged representation of the jacketed measuring tube shown in FIG. 1.

In FIG. 1 there is shown a flow-line 10 which may be a pipe line or, as here, a line through which a stream of lubricating oil is drawn from a fractionating tower to tankage (not shown). A small fluid takeoff pipe 11 connecting the flow-line with a cooler 12 provides a means for continuously withdrawing a relatively smaller sample stream of oil from the larger line 10 and passing it to the cooler 12 wherein the temperature of the oil flow is reduced to a temperature below that at which it is desired to measure and record the viscosity of the oil. From cooler 12 the oil is pumped at a constant rate by pump 13 through pipe 14 to heat exchange coil 15 positioned in the upper portion of a horizontal, cylindrical, heating bath 16, the purpose of which is to reheat the oil to the desired temperature and maintain that temperature as near to constant as possible. Heat is supplied to the cylindrical bath 16 through steam coil 17 positioned along the bottom of the bath.

There is an opening 18 at the end of steam coil 17 which discharges the steam into the bath water tangentially to the surface of the walls of the cylindrical bath as shown in FIG. 2. This is a preferred feature of the invention as I have found unexpectedly good temperature control results. It is pointed out, however, that other heat exchange arrangements could be used here effectively.

From heat exchange coil 15 the oil passes through pipe 19 to a jacketed tube 20. A temperature responsive element 21 is located at the discharge end of jacketed tube 20 which senses temperature variations in the oil and transmits to a temperature-control element 22 which in turn operates a flow-control valve 23 in a steam line leading to heating coil 17. This is a much preferred feature of the invention because when the temperature-responsive element 21 is in this preferred location the variations in temperature of the fluid may be both more effectively controlled and compensated for while utilizing only one temperature-responsive element. The principles involved here will be more fully explained hereinafter. Again, although the foregoing is preferred it is realized that other arrangements can be effectively utilized.

The jacket 24 surrounding the tube 20 is an airtight enclosure in which a vacuum is produced. The vacuum-surrounded tube 20 is an important part of my invention used to minimize temperature variations in the oil flowing through the tube. It is more fully shown in FIG. 4 and will be completely described further on in the specification. After leaving the jacketed tube the oil is returned through a pipe 25 to the flow-line 10, discharging into the line 10 at a point near the point at which the stream was originally withdrawn. A differential sensing element 26 which is connected across the opposite ends of a portion of the jacketed tube 20 by connecting lines 51 and 52 is provided to detect any pressure change across the tube 20 which may result from changes in the viscosity of the flowing oil. Such changes may be due to variations in viscosity of the oil or to slight changes in temperature or both.

An impulse from this sensing element 26 is conducted to an impulse exerting element 32 in the computing relay broadly designated as 27. Impulse exerting element 32 is represented as a bellows capable of exerting pressure against a pivoted element or balance bar 30 on an adjustable pivot or fulcrum 28. In order to compensate for slight temperature variations in the fluid to be measured, an output pressure from the temperature responsive element 21 via temperature control unit 22 actuates bellows 34 which in turn exerts a pressure or force against the balance bar 30. An increase in temperature in the fluid flowing through tube 20 results in an increase in pressure to bellows 34. This temperature increase brings about a corresponding decrease in viscosity which results in a decrease in pressure to bellows 32. Since bellows 34 applies pressure on the opposite side and the opposite end of the balance bar than bellows 32 and when one has an increase in pressure the other has a decrease, it can be said that the impulse transmitted to the balance bar designating temperature change is opposed in its effect on the balance of the bar to the effect of the impulse designating pressure change caused by a change in viscosity. In other words, changes in the impulse or force applied to the balance bar by bellows 34 and 32 tend to cancel each other when viscosity variation is due to temperature variation.

Stability of the computing relay system is obtained by means of a biasing bellows 36 which exerts a force on the balance bar 30 with a variable but controlled pressure supplied by an external air source 37 and regulated by valve 39. The impulse transmitted by the sensing element 26 is attributed to the differential pressure caused by the mass of oil flowing through tube 20 and also the differential pressure caused by the viscosity of the oil. These are inseparable, however, biasing bellows 36 is caused to exert a pressure equal to but opposed to the value of the differential pressure caused by the mass of oil flowing through tube 20 thereby leaving an impulse indicative of viscosity change. It will, therefore, be seen that the function of bellows 36 is to shift the zero reading or range of the viscosity recording instrument but has no effect upon its calibration. It serves to balance the system but the location of fulcrum 28 along balance bar 30 determines the effect of the various forces from bellows 32, 34 and 38 so that they are properly related. The bellows 38 is termed a reaction bellows which receives sufficient pressure from external source 37 to actuate the viscosity recording instrument 44.

At the end of the balance bar 30 is a flapper 40, which by its proximity to an air pilot valve 42, connected in parallel with bellows 38, regulates the pressure in the reaction bellows 38, received from an external pressure source 37. The external pressure is originally controlled by valve 41. The reacton force or pressure becomes the output pressure of the computing relay and is, therefore, the pressure recorded by the recording instrument 44 as the corrected viscosity.

In the present invention the impulses are in the form of output pressure, however, it should be realized that electrical energy or other means of transferring an impulse or force could be employed.

In FIG. 4 the jacketed tube 20, which is used for the measurement of differential pressure, is shown. The jacket 24 surrounding tube 20 forms a space which is evacuated and completely sealed. Means are provided in jacket 24 through this vacuum to allow connections 51 and 52 access to the tube 20 such as fittings 53 and 54. It will be noted that in the present preferred embodiment tube 20 is larger in diameter at its discharge end allowing space for a temperature responsive element 21 to be located therein. This part of the apparatus is also surrounded by an evacuated space formed by jacket 24.

I have found that the thermo-insulated tube is necessary to this type of continuous viscosity measuring apparatus for improving the accuracy of viscosity measurement by preventing fluctuations in the temperature of the fluid along the extent of tube 20. In further explanation as to the specific embodiment of this invention, slight variations in the oil flowing through tube 20 activate the temperature-control element 22 through temperature-responsive element 21 in the outlet of tube 20. This control causes the temperature of the water in the bath 16 to fluctuate so that at any time it may be higher or lower than the temperature of the oil stream leaving tube 20, or it may be changing. The temperature of the oil stream in the tube 20 must be kept as constant as possible in order to get reasonably accurate viscosity measurement. In order to dampen the effect of these relatively large temperature variations on tube 20 and to assure a more evenly controlled temperature along its entire length, I have developed this evacuated jacketed tube and found that it has great effect in accomplishing the desired result.

Of course, it should be realized that other thermo-insulation means could be employed, however, I have found the vacuum mean to be the most easily and effectively utilized.

Obviously, many modifications and variations of the invention, as hereinbefore set forth, may be made without departing from the spirit and scope thereof and, therefore, only such limitations should be imposed as are indicated in the appended claims.

I claim:

1. A continuous viscosimeter comprising, in combination, a tubular flow tube comprising an elongated first section of uniform relatively small cross sectional area, and a second section of relatively large cross sectional area at one end of said first section; means for passing liquid through said flow tube at substantially constant flow rate and temperature; pressure sensing means operatively connected into said first section and operable to produce a pulse proportional to pressure drop in said first section; a temperature sensing device located within said second section in the line of flow of such liquid and responsive to slight variations of temperature therein and operable to produce a pulse proportional to temperature; means operatively connected to both said pressure sensing means and said temperature sensing means for receiving pulses from both of said sensing means and converting them to a single pulse as a measure of actual viscosity of such liquid.

2. A viscosimeter in accordance with claim 1, also comprising a jacket surrounding both said first and second sections of said flow tube in annularly spaced relation thereto to provide an annular space therebetween for insulation against heat transfer to and from the liquid flowing through said flow tube.

3. An apparatus for continuously measuring the viscosity of a fluid in a system comprising, in combination, means to control the flow-rate of the fluid through said system; means for controlling the temperature of said fluid; means for sensing the pressure differential across at least a section of said system; means positioned in the line of flow of said fluid for directly sensing a temperature change in the system; viscosity computing means comprising means to transmit an impulse designating the sensed pressure differential, means to transmit an impulse designating the change of temperature in the system, and means to receive both impulses and convert them to a single impulse designating pressure differential corrected to a standard temperature as a measure of actual viscosity of the fluid; and an indicating element connected to said last named means for continuously indicating the pressure differential so corrected, as a measure of actual viscosity of the fluid.

4. An apparatus for continuously measuring the viscosity of a fluid in a system comprising, in combination, means to control the flow-rate of the fluid in the system; means to control the temperature of the fluid, including a heat controlled bath through which said fluid flows in indirect heat exchange relationship; a tube disposed in said system; means for sensing the pressure differential across said tube; means positioned adjacent said tube in the line of flow of said fluid, for directly sensing a temperature change in the fluid; viscosity computing means comprising a pivoted element, means for transmitting an impulse designating the sensed pressure differential to said pivoted element, means for transmitting to said pivoted element an impulse opposed to the pressure differential impulse and designating a change of temperature of said fluid, means for transmitting a controlled stable impulse to said pivoted element to control the range of viscosity measurement, and means to transmit a balancing impulse to said pivoted element thereby generating a reaction designating pressure differential corrected to a standard temperature; and a measuring element connected to said last named means to continuously indicate the pressure differential so corrected, as a measure of actual viscosity as determined by the balancing impulse.

5. An apparatus for continuously measuring the viscosity of a fluid in a system comprising, in combination, means for controlling the flow-rate of the fluid through said system; means for controlling the temperature of said fluid, including a heat controlled bath through which said fluid flows in indirect heat exchange relationship; means for sensing the pressure differential across at least a section of said system; thermo-insulating means surrounding that section of the system across which the differential pressure is sensed; temperature compensating means comprising a temperature responsive element positioned in the line of flow of said fluid for direct heating thereby, and capable of delivering an impulse caused by a change of temperature in the system; means whereby a resultant impulse caused by the temperature change and the sensed differential pressure is generated; and an indicating element connected to said last named means for continuously indicating the magnitude of the resultant impulse as a measure of actual viscosity of said fluid.

6. An apparatus for continuously measuring the viscosity of a fluid in a system as set forth in claim 5, wherein said system includes a tube across which the differential pressure is sensed, and wherein said thermo-insulating means includes a sealed evacuated jacket surrounding said calibrated tube.

7. An apparatus for continuously recording the viscosity of a fluid in a system comprising, in combination, means for controlling the flow-rate of the fluid through said system; means for controlling the temperature of said fluid; means for sensing the pressure differential across at least a section of said system; thermo-insulating means surrounding that section of the system across which the differential pressure is sensed; means positioned in the line of flow of said fluid for direct heating thereby for sensing a temperature change in the system; viscosity indicating means comprising means for transmitting an impulse designating the sensed pressure differential, means for transmitting an impulse designating the change of temperature in the system, and means for receiving both impulses and converting them to a single impulse designating actual viscosity of the fluid; and a recording element connected to said last named means for continuously recording the magnitude of the single impulse as a measure of actual viscosity of the fluid.

8. An apparatus for continuously recording the viscosity of a fluid in a system comprising, in combination, means for controlling the flow-rate of the fluid through said system; means for controlling the temperature of said fluid, including a bath through which said fluid flows in indirect heat exchange relationship and means for heating said bath; a tube disposed within said system; means for sensing the pressure differential across said tube; a sealed evacuated jacket surrounding said tube; means for sensing a temperature change in the fluid, including a temperature responsive element located in the line of flow at the discharge end of said tube; viscosity computing means comprising a pivoted element, means for transmitting an impulse designating the sensed pressure differential to said pivoted element, means for transmitting to said pivoted element an impulse opposed to the pressure differential impulse and designating a change of temperature of said fluid, means for transmitting a controlled stable impulse to said pivoted element to control the range of viscosity measurement, and means for transmitting a balancing impulse to said pivoted element thereby generating a reaction designating pressure differential corrected to a standard temperature; and a recording element connected to said last named means to continuously record the pressure differential so corrected as a measure of actual viscosity as determined by the balancing impulse.

9. A viscosimeter comprising, in combination, a tank adapted to contain a pool of liquid; means associated with said tank for heating such liquid; a continuous tubular flow tube within said tank in position to be immersed in such liquid; a sealed evacuated insulating jacket surrounding said tubular flow tube in annularly spaced relation thereto against heat transfer to and from the liquid flowing therethrough, and also in position to be immersed in such liquid; a pipe coil within said tank in position to be immersed in such liquid, having one end thereof connected to said tubular flow tube; means for passing a stream of fluid into and through said pipe coil and thence into said flow tube at a substantially constant flow rate; and pressure sensing means operatively connected into said tubular flow tube for sensing pressure drop therethrough as a function of viscosity.

10. A viscosimeter in accordance with claim 9 wherein said pressure sensing means comprises a pair of conduits connected into said flow tube at positions spaced longitudinally from one another and extending radially out through said jacket, and a pressure responsive device connected between said conduits for generating a signal proportional to pressure differential.

11. Apparatus for continuously measuring the viscosity of a fluid in a system comprising, in combination, a bath tank adapted to contain a bath liquid; a viscosimeter tube in said bath tank in position to be immersed in said liquid; a jacket surrounding said viscosimeter tube in annularly spaced relation thereto to provide an annular space therebetween for insulation against heat transfer to and from the liquid flowing through said viscosimeter tube; a tubular coil in said tank adapted to be immersed in said liquid and connected to said viscosimeter tube for supplying fluid thereto; means for pumping fluid at a constant flow rate through said tubular coil and said viscosimeter tube; heating means in said tank adapted to be immersed in said liquid for supplying heat to said liquid; control means for controlling the amount of heat supplied by said heating means; means positioned in the line of flow of said fluid passing through said viscosimeter tube for directly sensing a temperature change in the system, said last named means being operatively connected to said control means for automatically regulating the supply of heat in accordance with changes in the temperature of the fluid passing through the viscosimeter tube; and pressure sensing means connected into said viscosimeter tube for measuring pressure drop therethrough as a function of viscosity.

12. A viscosimeter in accordance with claim 9, also comprising a temperature sensing device located within said flow tube in the line of flow of liquid flowing therethrough.

References Cited in the file of this patent

UNITED STATES PATENTS

| | | |
|---|---|---|
| 2,322,814 | Binckley | June 29, 1943 |
| 2,333,884 | Porter | Nov. 9, 1943 |
| 2,441,044 | Tate | May 4, 1948 |
| 2,459,483 | Zimmer et al. | Jan. 18, 1949 |
| 2,631,599 | Markson | Mar. 17, 1953 |
| 2,675,818 | Gallo et al. | Apr. 20, 1954 |
| 2,791,902 | Jones | May 14, 1957 |
| 2,837,913 | Rich et al. | June 10, 1958 |

FOREIGN PATENTS

| | | |
|---|---|---|
| 656,148 | Germany | Jan. 29, 1938 |
| 657,696 | Great Britain | July 26, 1951 |